US010324643B1

(12) United States Patent
Huang et al.

(10) Patent No.: US 10,324,643 B1
(45) Date of Patent: Jun. 18, 2019

(54) AUTOMATED INITIALIZATION AND CONFIGURATION OF VIRTUAL STORAGE POOLS IN SOFTWARE-DEFINED STORAGE

(71) Applicant: EMC Corporation, Hopkinton, MA (US)

(72) Inventors: Lijun Huang, Beijing (CN); Jieming Di, Beijing (CN); Yu Cao, Beijing (CN); Hui Liu, Westborough, MA (US); Devanjan Sarkar, Nashua, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 45 days.

(21) Appl. No.: 14/870,475

(22) Filed: Sep. 30, 2015

(51) Int. Cl.
*G06F 3/06* (2006.01)

(52) U.S. Cl.
CPC .......... *G06F 3/0631* (2013.01); *G06F 3/0607* (2013.01); *G06F 3/067* (2013.01); *G06F 3/0644* (2013.01)

(58) Field of Classification Search
CPC ...... G06F 3/0631; G06F 3/0607; G06F 3/067; G06F 3/0605; G06F 3/0629; G06F 3/0644; G06F 3/0683; G06F 3/0685; G06F 3/0604
See application file for complete search history.

(56) References Cited

U.S. PATENT DOCUMENTS 8,156,281 B1 * 4/2012 Grosner ................ G06F 3/0607 711/114
8,438,342 B1 * 5/2013 Todd ..................... G06F 3/0605 711/108
8,856,400 B1 * 10/2014 Davidson .............. G06F 3/0617 710/17
9,092,350 B1 * 7/2015 Jeon ...................... G06F 11/004
2004/0243699 A1 * 12/2004 Koclanes ................ H04L 29/06 709/224
2005/0234941 A1 * 10/2005 Watanabe ............ G06F 3/0605
2006/0236061 A1 * 10/2006 Koclanes .............. G06F 3/0605 711/170

(Continued)

FOREIGN PATENT DOCUMENTS

WO WO 2014185837 A1 * 11/2014 .......... H04L 1/1678

OTHER PUBLICATIONS

English Oxford Living Dictionary, Oxford University Press, https://en.oxforddictionaries.com/, Definition of Matrix and Definition of Vector.*

*Primary Examiner* — Michael Krofcheck
(74) *Attorney, Agent, or Firm* — Daly, Crowley, Mofford & Durkee, LLP

(57) ABSTRACT

A computer implemented method, a computer program product, and a system for automated virtual storage pools within a software-defined storage comprising: receiving a set of physical storage resources that is enabled to have different storage capabilities; receiving a set of applications, wherein each application of the set of applications is enabled to require different storage capabilities; finding most frequently preferred storage capabilities requirements from capabilities of the set of applications; identifying a number of virtual storage pools based on the set of applications; and clustering at least some of the set of physical storage resources into the number of identified virtual storage pools.

16 Claims, 13 Drawing Sheets

(56) References Cited

U.S. PATENT DOCUMENTS

| | | | | |
|---|---|---|---|---|
| 2009/0249018 | A1* | 10/2009 | Nojima | G06F 3/0613<br>711/170 |
| 2013/0232261 | A1* | 9/2013 | Wright | H04L 41/50<br>709/224 |
| 2015/0117274 | A1* | 4/2015 | Lu | H04L 1/1678<br>370/280 |
| 2015/0186256 | A1* | 7/2015 | Cao | G06F 3/0605<br>711/154 |
| 2016/0188407 | A1* | 6/2016 | Bronnikov | G06F 11/1076<br>714/764 |

* cited by examiner

AUTOMATED INITIALIZATION AND CONFIGURATION OF VIRTUAL STORAGE POOLS IN SOFTWARE-DEFINED STORAGE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to initialization and configuration of virtual storage pools.

BACKGROUND

Generally, computer systems may include different resources used by one or more host processors. Conventionally, resources and host processors in a computer system may be interconnected by one or more communication connections. Typically, data storage systems may be coupled to one or more servers or host processors and provide storage services to each host processor. Generally, multiple data storage systems from one or more different vendors may be connected and may provide common data storage for one or more host processors in a computer system.

Generally, different tasks may be performed in connection with a data storage system. Typically, a customer may perform data storage configuration and provisioning tasks. Conventionally, tasks may include configuring and provisioning storage. Generally, with such options in connection with performing configuration and provisioning tasks, a customer may not have the appropriate level of sophistication and knowledge needed.

SUMMARY

A computer implemented method, a computer program product, and a system for automated virtual storage pools within a software-defined storage comprising: receiving a set of physical storage resources that is enabled to have different storage capabilities; receiving a set of applications, wherein each application of the set of applications is enabled to require different storage capabilities; finding most frequently preferred storage capabilities requirements from capabilities of the set of applications; identifying a number of virtual storage pools based on the set of applications; and clustering at least some of the set of physical storage resources into the number of identified virtual storage pools.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
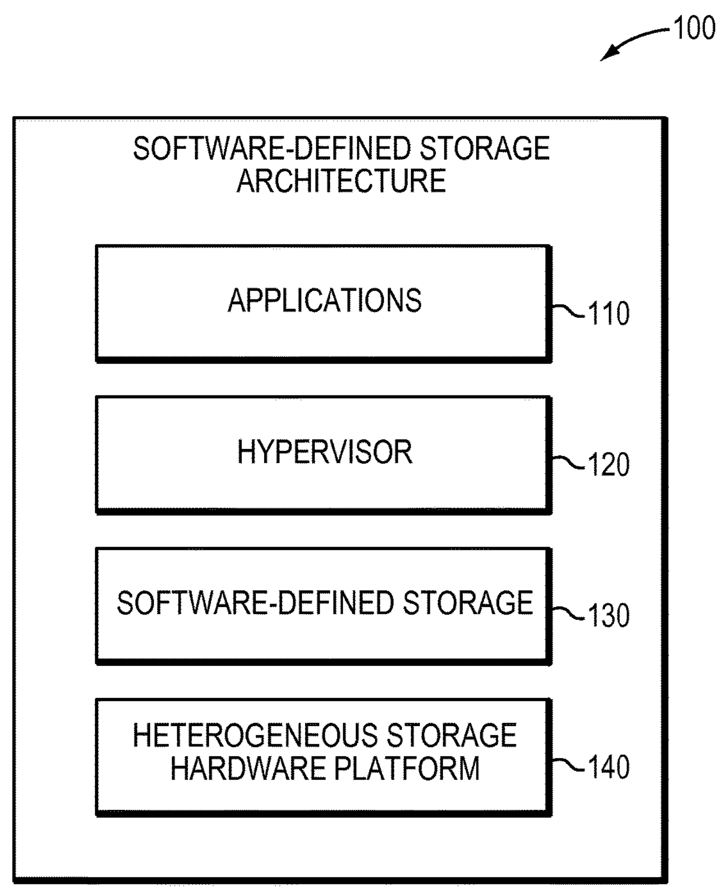
FIG. 1 is a simplified illustration of a system depicting software-defined storage architecture in accordance with an embodiment of the present disclosure.

Conventionally, software-defined storage (SDS) platforms may provide virtualization, automation, and management capabilities necessary to abstract physical storage arrays with different capabilities into a single pool of virtual storage. Traditionally, virtual storage administrators create virtual storage pools (VSP) that represent sets of storage capabilities required by unique application workloads. Generally, users may subscribe to virtual storage pools that meet their unique requirements. Typically, for example, a transactional workload would subscribe to a virtual storage pool that features the characteristics of a high-performance block store. Usually, for example, a cloud application such as online file and content sharing would subscribe to a virtual storage pool that features the characteristics of a distributed object or file-based storage cloud.

Generally, as applications interact with virtual storage pools for data services, it may become a critical problem about how to efficiently organize physical storage resources managed by software-defined storage platforms into one or multiple virtual storage pools that best meet requirements in terms of both application workloads' Quality of Service (QoS) and platform manageability.

Generally, the initialization and configuration of virtual storage pools to a large extent rely on a storage administrator or some simple predefined policies. In some embodiments, traditional approaches to software-defined virtual storage pool initialization and configuration may face challenges in terms of complexity, scalability, effectiveness, efficiency, and operational cost.

Generally, in a typical software-defined storage deployment environment, there may be various types of heterogeneous storage hardware and numerous business applications with diverse storage provisioning requirements. Typically, with substantial increased complexity of storage resources and applications supported by software-defined storage, it may become too complicated for human administrators to conduct manual virtual storage pool initialization and configuration.

Generally, manual virtual storage pool initialization and configuration may include analyze storage request, find best available storage, provision storage, and complete request. Conventionally, analyzing a storage request encompasses gathering information about storage requirements, such as performance, capacity, compatibility, usage profile, and data protection. Typically, finding a best available storage encompasses finding the best available storage according to certain characteristics, such as tier and service level, storage array, device group, device type, and data path. Generally, provisioning of storage entails storage configuration, fabric configuration, host configuration, and application configuration. Conventionally, completing a request entails notifying user of the storage that the storage provisioning has been completed.

Conventionally, existing virtual storage pool initialization methods may have limited abilities to expand to accommodate a growing amount of work pertaining to storage resources and applications. In some embodiments, on a third platform where large-scale storage deployment may become more and more common, it may be critical to automate the virtual storage pool initialization with better scalability.

Generally, with conventional manual or policy-based approaches to initialization and configuration of virtual storage pools, the effectiveness of provisioning virtual storage pools to a large extent may rely on domain expertise, working experience, and best practices of the storage administrator. Typically, configuration and initialization of virtual storage pools by an inexperienced administrator may result in pool-quality virtual storage pool management and usage.

Conventionally, since virtual storage pool initialization and configuration may be the first step for a software-defined storage to be accessible by applications, manual approaches may require a large amount of preparation time to deploy and tune virtual storage pools. Typically, the time to prepare, deploy and tune a virtual storage pool may result in a large delay between when a user requested data service and when the data service is available to the user.

Generally, manual configuration and initialization of virtual storage pools may not offer cost effective way to create data storage services due to the overhead cost of having an administrator configure the data services.

In many embodiments, software-defined storage (SDS) may be software intelligence-driven management of data storage atop heterogeneous storage hardware platforms. In some embodiments, a method of implementing configurations in software-defined storage may result in a significant improvement of the system's Quality of Service (QoS) to an end-user. In most embodiments, the current disclosure may enable an automated and workload-aware approach to initialization and configuration of virtual storage pools within a software-defined storage.

In many embodiments, conducting data mining on information about both storage QoS requirements of application workloads and about capabilities of underlying physical storage resources may automate a decision-making process for a set of virtual storage pools. In some embodiments, the current disclosure may enable virtual storage pools to be initialized and configured before or after a software-defined storage platform is deployed. In other embodiments, data mining-based and workload-aware approaches may be able to handle complicated application workloads in an efficient, scalable, and reliable manner.

In many embodiments, a method of automating initialization and configuration for a virtual storage pool may include inputting a set of physical storage resources with different capabilities. In other embodiments, a set of applications may be inputted into a graphical user interface. In certain embodiments, applications of different types and applications of different storage requirements may be inputted into a graphical user interface. In most embodiments, an output resulting from automating initialization and configuration for a virtual storage pool may include assigning storage resources into different virtual storage pools according to application workloads.

In many embodiments, a framework for automating initialization and configuration for virtual storage pools may be software for execution on a management system. In other embodiments, a management system may include hardware and/or software components. In most embodiments, a management system may include one or more processors connected to one or more Input/Output (I/O) devices, such as a display, a keyboard, a mouse, or a graphical user interface. In other embodiments, a management system may be in connection with management of storage systems. In many embodiments, a storage system manager may provision storage system resources. In several embodiments, a management system may be connected to one or more storage systems through a communication medium. In some embodiments, a communication medium may be the Internet, an intranet, a network, a LAN connection, or an iSCSI or Fibre Channel connection.

In many embodiments, physical storage resources may be represented as a multi-dimension capability vector. In some embodiments, a multi-dimensional capability vector may be represented by the following equation:

$$r_j=(D_{1,j},D_{2,j}, \ldots ,D_{t,j})$$

where $D_{1,j}$, $D_{2,j}$, . . . , $D_{t,j}$ may represent storage resource capability dimensions, such as capacity, Input/Output Operations per Second (IOPS) and Disaster Recovery (DR) support.

In many embodiments, for virtual storage pools, physical storage resources with the same or similar capability vectors may be clustered into a virtual storage pool according to application workloads. In some embodiments, virtual storage pools may be represented as a multi-dimensional capability vector by the following equation:

$$v_j=(D_{1,j},D_{2,j}, \ldots ,D_{t,j})$$

where $D_{1,j}$, $D_{2,j}$, . . . , $D_{t,j}$ may represent a grouping of physical storage resources.

In many embodiments, applications may be defined by different types as a multi-dimensional requirement vector. In most embodiments, applications may be defined by different storage requirements as a multi-dimensional requirement vector. In some embodiments, applications may be defined by the following vector equation:

$$a_j=(D_{1,j},D_{2,j}, \ldots ,D_{t,j})$$

where $D_{1,j}$, $D_{2,j}$, . . . , $D_{t,j}$ may represent application types such as Oracle®, SAP® applications, and Microsoft Exchange®. In some embodiments, $v_j$ and $a_j$ may have the same vectors dimensions as $r_j$.

In many embodiments, a virtual storage pool initialization and configuration procedure may entail the following steps: (1) find applications' most frequent requirement dimensions represented to be represented by the variable M; (2) identify an appropriate number K of virtual storage pools which may most meet an application's requirements; and (3) cluster storage resource capability vectors into K clusters by calculating similarity of most frequent application requirement dimensions (M). In some embodiments, vector clusters may lead to a virtual storage pool encompassing physical storage resources corresponding to application requirement vectors.

In many embodiments, a virtual storage pool initialization and configuration procedure may include finding applications' most frequent requirement dimensions among a set of applications using a statistical method. In most embodiments, applications may have multiple requirement dimensions that may map to capability dimensions of physical storage resources, such as capacity and latency requirements. In other embodiments, virtual storage pools may be a combination of physical storage resources with similar capabilities as a result of similar application requirement dimensions that may map to capability dimensions of physical storage resources.

In most embodiments, finding frequently referred application requirement dimensions among application requirement vectors may be performed using a statistical method. In some embodiments, a statistical method may include an observational study of multiple application requirement vectors to determine an association between dimensions of application requirement vectors. In many embodiments, a variable M may be a measure of similarity between physical storage resources based on frequently referred application requirement dimensions among a set of application vectors. In most embodiments, frequently referred application requirement dimensions may be represented by:

$$D=(D_1,D_2, \ldots ,D_t)$$

where the vector D may be equal to frequently referred application requirement dimensions.

In many embodiments, a virtual storage pool initialization and configuration procedure may entail identifying an appropriate number of virtual storage pools. In most embodiments, application dimensions may be classified according to their types, such as Oracle®, SAP® applications, and Microsoft Exchange®. In some embodiments, application classes with similar application requirement vectors may be combined into virtual storage pools as a result of calculating the cosine similarity between application requirement vectors. In many embodiments, application requirement vectors with the same application requirement dimensions may have a cosine similarity of 1. In most embodiments, application vectors without similar application requirement dimensions may have a cosine similarity of 0. In other embodiments, cosine similarity may entail a soft cosine measure. In some embodiments, a soft cosine measure may be a measure of a "soft" similarity between multiple application requirement vectors. In some embodiments, a soft similarity may be a measure that considers similarity of application requirement dimensions between multiple application requirement vectors. In many embodiments, there may be K classes of applications with similar application requirement vectors and a corresponding K number of virtual storage pools. In most embodiments, application classes may be classified according to priority level.

In many embodiments, a virtual storage pool initialization and configuration procedure may entail clustering physical storage resource pools into different K clusters. In most embodiments, clustering storage resource capability vectors into K number of clusters may entail calculating similarity on the most frequent application requirement dimensions. In some embodiments, clustering of storage physical storage resource pools may include common clustering methods. In other embodiments, common clustering methods may include k-means, hierarchical clustering, self-organizing map clustering (SOM), and fuzzy c-means (FCM) clustering.

In many embodiments, a k-means may be a preferred clustering method. In some embodiments, k-means clustering may include grouping multiple dimensions into K clusters where dimensions may belong to a cluster with the nearest mean. In other embodiments, utilizing k-means to implement a clustering method may entail several steps.

In many embodiments, a k-means clustering method may include obtaining frequently referred dimensions from a set of application requirement vectors that may be described as $D=(D_1, D_2, \ldots, D_t)$ and obtaining cluster number K from the number of application classes.

In most embodiments, a k-means clustering method may include placing K points into a space represented by the dimension objects of the application requirement vectors that may be clustered. In other embodiments, K points may represent initial group centroids. In some embodiments, a centroid may be an arithmetic mean position of all of the K points.

In many embodiments, a k-means clustering method may include assigning dimension objects to a group that has the closest centroid.

In most embodiments, a k-means clustering method may include recalculating the positions of the K points when all dimension objects have been assigned.

In other embodiments, a k-means clustering method may include repeating step three and step four until the centroids no longer move. In some embodiments, a separation of the objects into groups from which the metric to be minimized may be calculated.

Reference is now made to FIG. 1, which is a simplified illustration of a system depicting software-defined storage architecture in accordance with an embodiment of the present disclosure. Shown in FIG. 1 is software-defined storage architecture 100. Software-defined storage architecture 100 encompasses an applications layer 110, a hypervisor layer 120, a software-defined storage layer 130, and a heterogeneous storage hardware platform layer 140.

Figure 2:
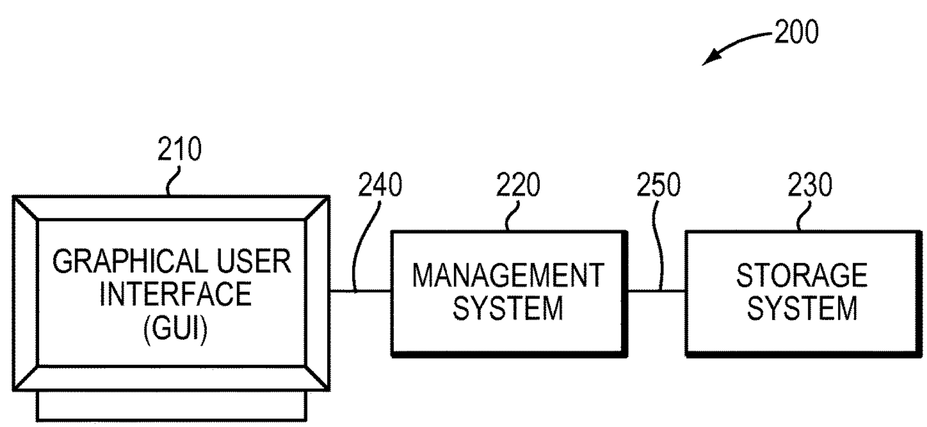
FIG. 2 is a simplified illustration of a system for automation of provisioning virtual storage pools within a software-defined storage in accordance with an embodiment of the present disclosure.

Reference is now made to FIG. 2, which is a simplified illustration of a system used in connection with performing the techniques described herein in accordance with an embodiment of the present disclosure. System 200 includes graphical user interface (GUI) 210 in communication with management system 220 through communication medium 240. System 200 includes management system 220 in communication with storage system 230 through a communication medium 250.

Figure 3:
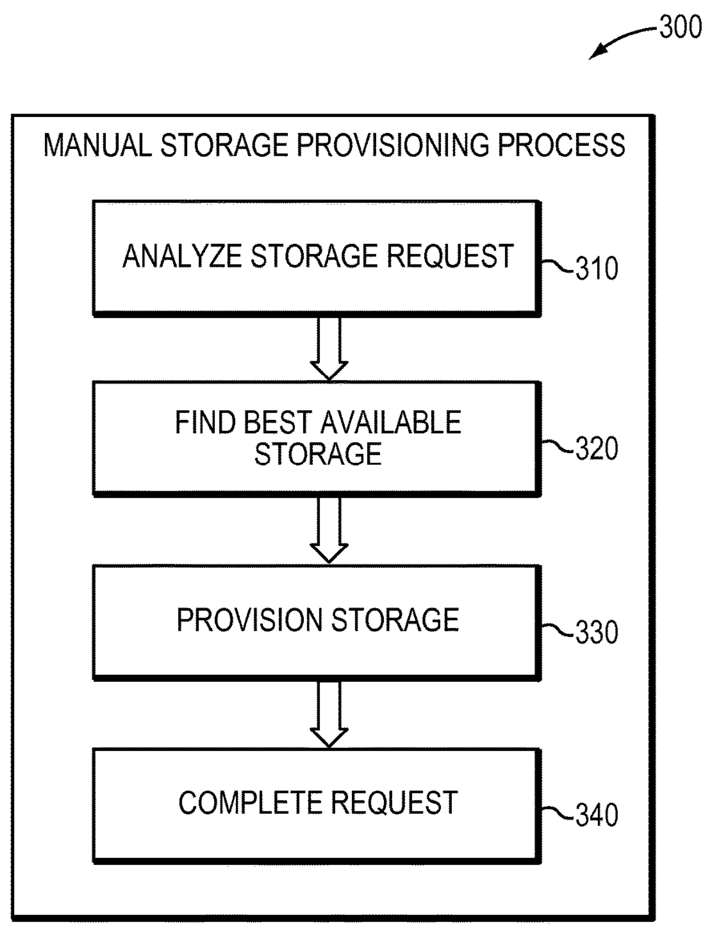
FIG. 3 is a simplified illustration of a method for a manual storage provisioning process in accordance with an embodiment of the present disclosure.

Refer now to the example embodiment of FIG. 3. FIG. 3 is a simplified illustration of a method for a manual storage provisioning process in accordance with an embodiment of the present disclosure. In FIG. 3, an operator analyzes storage request from a customer (step 310). An operator finds best available storage (step 320). An operator provisions storage resources (step 330). An operator completes customer request (step 340).

Figure 4:
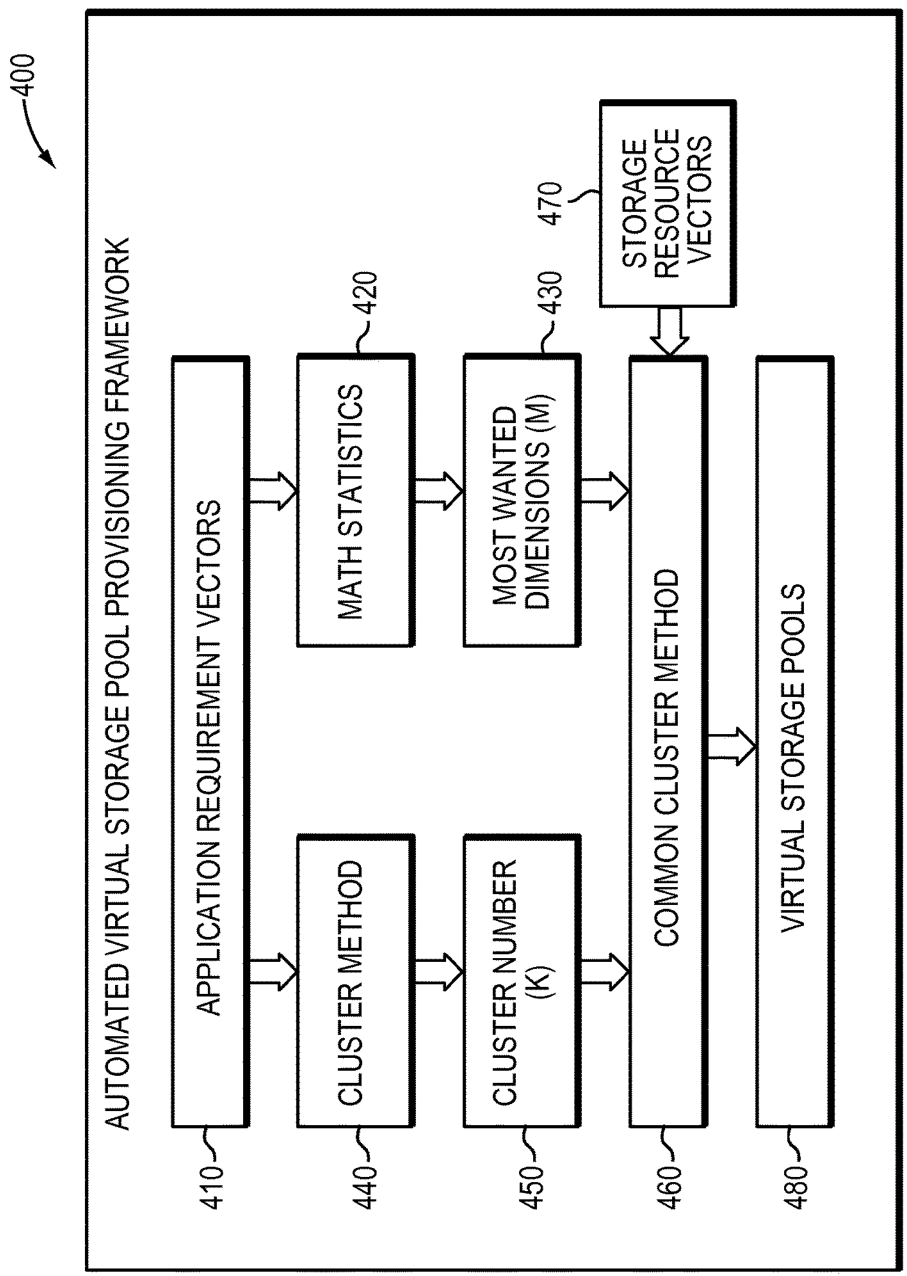
FIG. 4 is a simplified illustration of a method for automation of provisioning virtual storage pools within a software-defined storage in accordance with an embodiment of the present disclosure.

Refer now to the example embodiment of FIG. 2 and FIG. 4. FIG. 4 is a simplified illustration of a method for automation of provisioning virtual storage pools within a software-defined storage in accordance with an embodiment of the present disclosure. FIG. 4 illustrates a method of an automated virtual storage pool provisioning framework 400 in management system 210. Management system 210 identifies application requirement vectors (step 410). Management system 210 performs math statistics on application requirement vectors (step 420). Management systems finds most wanted dimensions (M) (step 430). Management system 210 performs cluster method on application requirement vectors (step 440). Management system 210 finds cluster number (K) (step 450). Management system utilizes common cluster method to find virtual storage pools (step 480).

Figure 5:
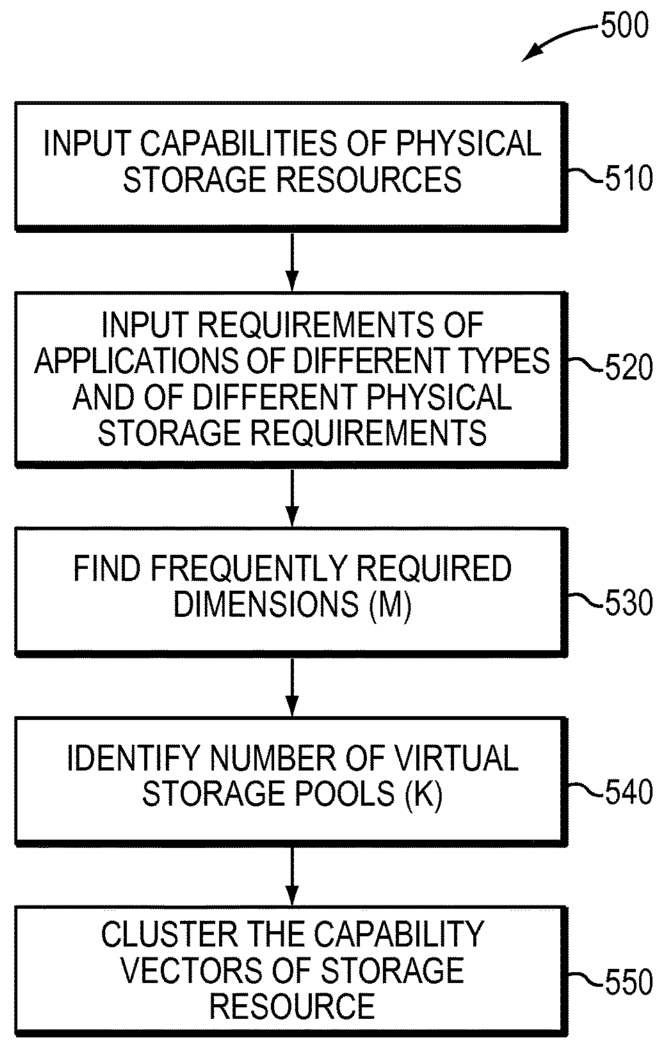
FIG. 5 is a simplified illustration of a method for automation of provisioning virtual storage pools within a software-defined storage in accordance with an embodiment of the present disclosure.

Refer now to the example embodiment of FIG. 2 and FIG. 5. FIG. 5 is a simplified illustration of a method for automation of provisioning virtual storage pools within a software-defined storage in accordance with an embodiment of the present disclosure. Input capabilities of physical storage resources into graphical user interface 210 (step 510). Input requirements of applications of different types and of applications of different physical storage requirements in graphical user interface 210 (step 520). Management system 220 finds frequently required dimensions (M) (step 530). Management system 220 identifies number of virtual storage pools (K) (step 540). Management system 220 clusters capability vectors of storage resources (step 550).

Figure 6:
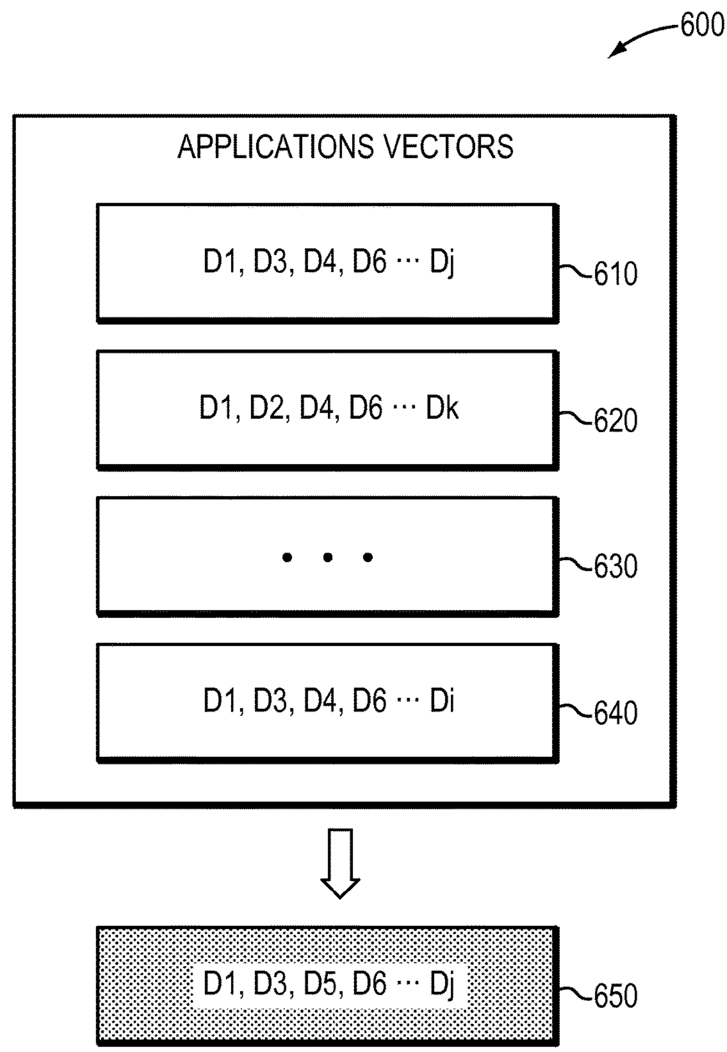
FIG. 6 is a simplified sample illustration for identification of the most frequently preferred physical storage requirements from a set of applications in accordance with an embodiment of the present disclosure.

Refer now to the example embodiment of FIG. 6. FIG. 6 is a simplified sample illustration for identification of the most frequently preferred physical storage requirements from a set of applications in accordance with an embodiment of the present disclosure. Application requirement vector 610 encompasses application requirement dimensions D1, D3, D4, D6 . . . Dj. Application requirement vector 620 encompasses application requirement dimensions D1, D2, D4, D6 . . . Dk. Application requirement vector 640 comprises application requirement dimensions D1, D3, D4, D6 . . . Di. The most frequently preferred requirement dimensions from the application requirement vectors 610, 7620, 630, and 640 are in the form of application requirement vector 650, which encompasses application requirement dimensions D1, D3, D5, D6 . . . Dk.

Figure 7:
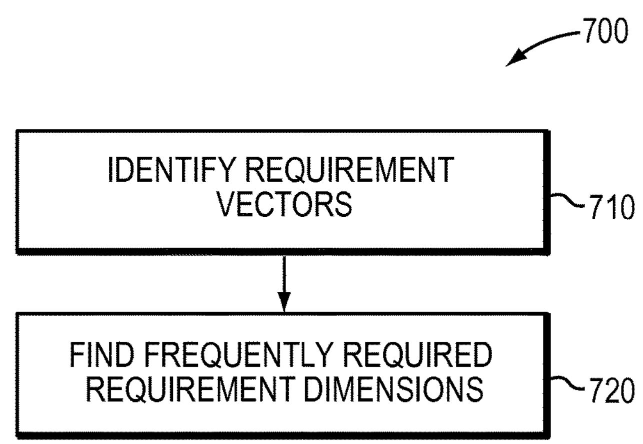
FIG. 7 is a simplified illustration of a method for identification of the most frequently preferred physical storage requirements from a set of applications in accordance with an embodiment of the present disclosure.

Refer now to example embodiments of FIG. 2, FIG. 6, and FIG. 7. FIG. 7 is a simplified illustration of a method for identification of the most frequently preferred physical storage requirements from a set of applications in accordance with an embodiment of the present disclosure. Management system 220 identifies requirement vectors 610, 620, 630, and 640 (step 710). Management system 220 finds frequently preferred requirement dimensions 650 (step 620).

Figure 8:
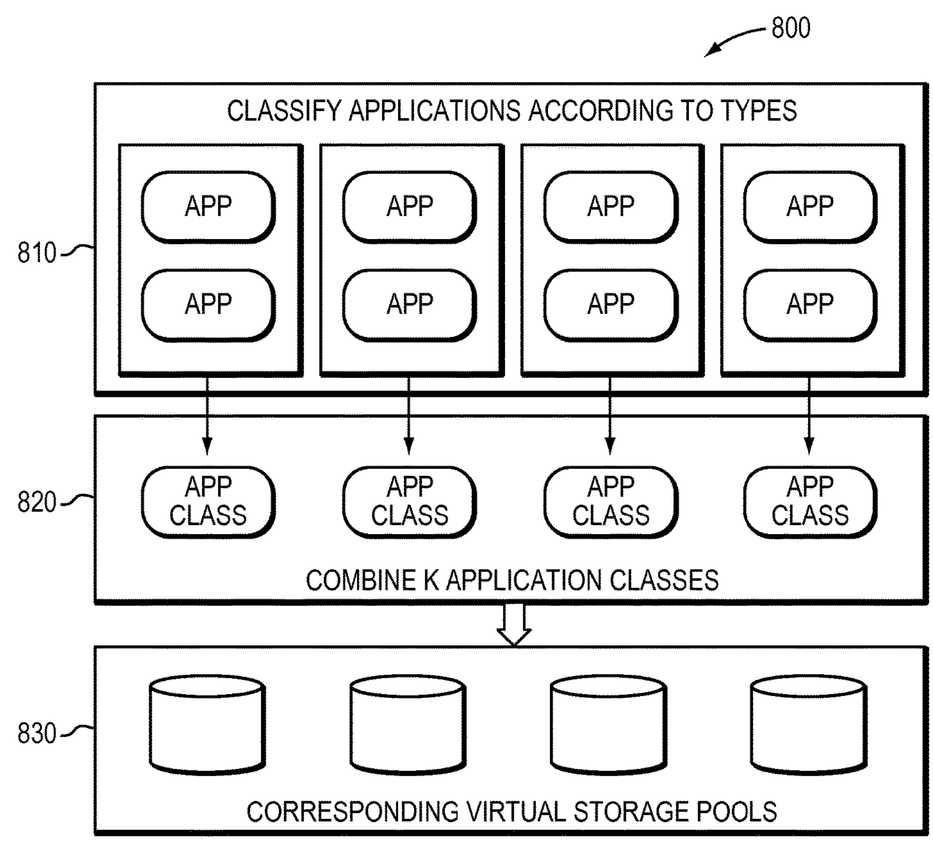
FIG. 8 is a simplified illustration of a system for identifying a number of virtual storage pools within a software-defined storage in accordance with an embodiment of the present disclosure.

Refer now to example embodiment of FIG. 8. FIG. 8 is a simplified illustration of a system for identifying a number of virtual storage pools within a software-defined storage in accordance with an embodiment of the present disclosure. System 800 includes a module for classifying applications according to types 810. System 800 includes a module for combining K number of application classes 820. System 800 includes a module for creating a corresponding number of virtual storage pools 830.

Figure 9:
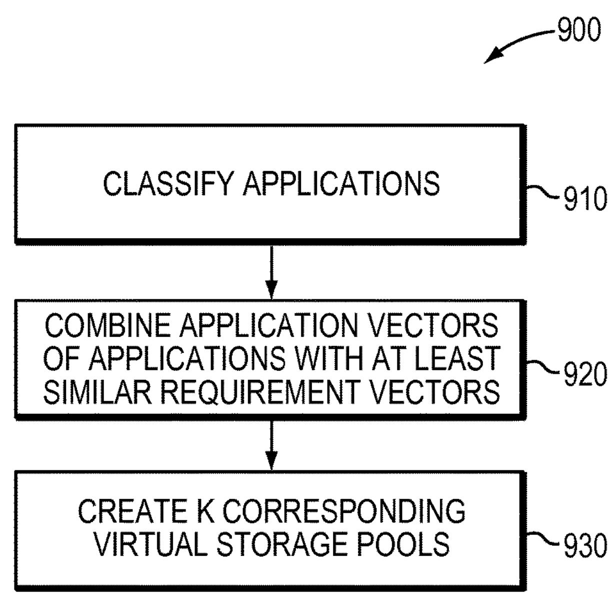
FIG. 9 is a simplified illustration of a method for identifying a number of virtual storage pools with a software-defined storage in accordance with an embodiment of the present disclosure.

Refer now to example embodiments of FIG. 8 and FIG. 9. FIG. 9 is a simplified illustration of a method for identifying a number of virtual storage pools with a software-defined storage in accordance with an embodiment of the present disclosure. Module 810 classifies applications according to types (step 910). Module 820 combines applications according to types into K number of applications classes (920). Module 830 creates a K number of virtual storage pools corresponding to K number of application classes (930).

Figure 10:
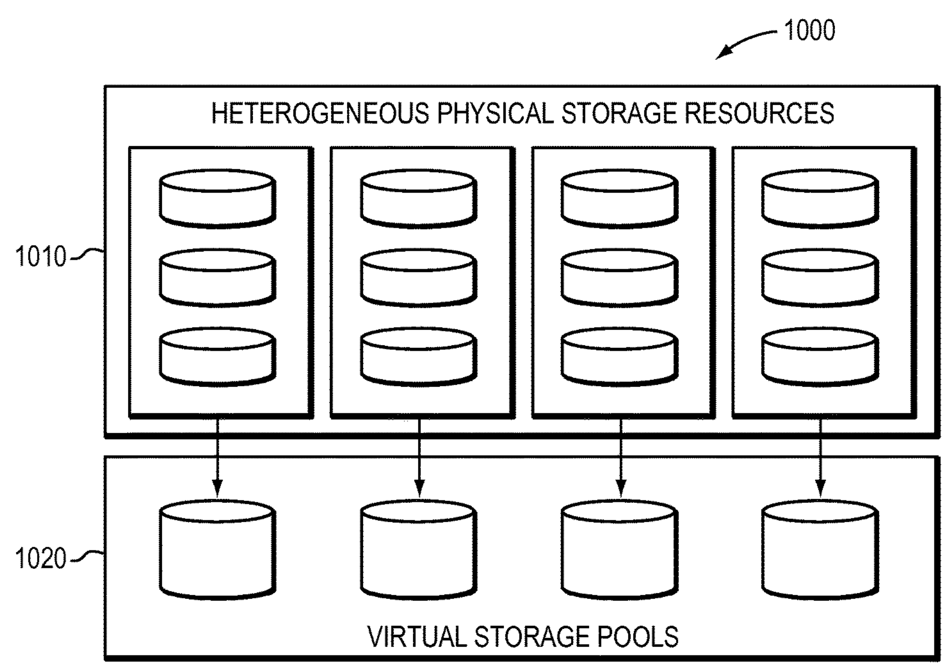
FIG. 10 is a simplified illustration of a system for clustering heterogeneous physical storage resources with at least similar capabilities into virtual storage pools within a software-defined storage in accordance with an embodiment of the present disclosure.

Refer now to the example embodiment of FIG. 10, which is a simplified illustration of a system for clustering heterogeneous physical storage resources with at similar capabilities into virtual storage pools within a software-defined storage in accordance with an embodiment of the present disclosure. System 1000 includes module 1010 for heterogeneous physical storage resources. System 1000 includes module 1020 for virtual storage pools 1020.

Figure 11:
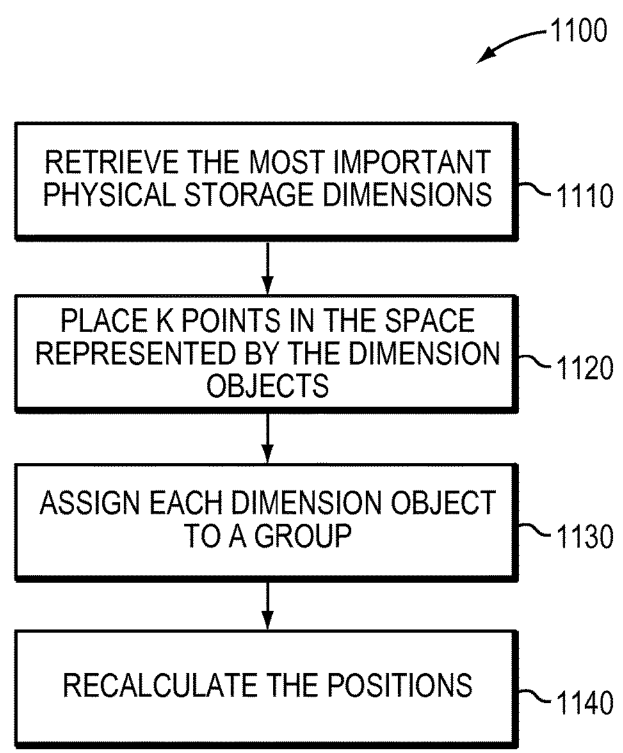
FIG. 11 is a simplified illustration of a method of clustering physical storage resources with at least similar capabilities into virtual storage pools in accordance with an embodiment of the present disclosure.

Refer now to the example embodiments of FIG. 2, FIG. 10, and FIG. 11. FIG. 11 is a simplified illustration of a method of clustering physical storage resources with at least similar capabilities into virtual storage pools in accordance with an embodiment of the present disclosure. In FIG. 11, management system 220 utilizes common cluster method to retrieve physical storage dimensions 1010 (step 1110). Management system 210 utilizes common cluster method to place K points in space represented by the dimension object (step 1120). Management system 210 utilizes common cluster method to assign dimension objects to a group 1010 (step 1130). Management system 210 utilizes common cluster method to recalculate the positions (step 1140).

Figure 12:
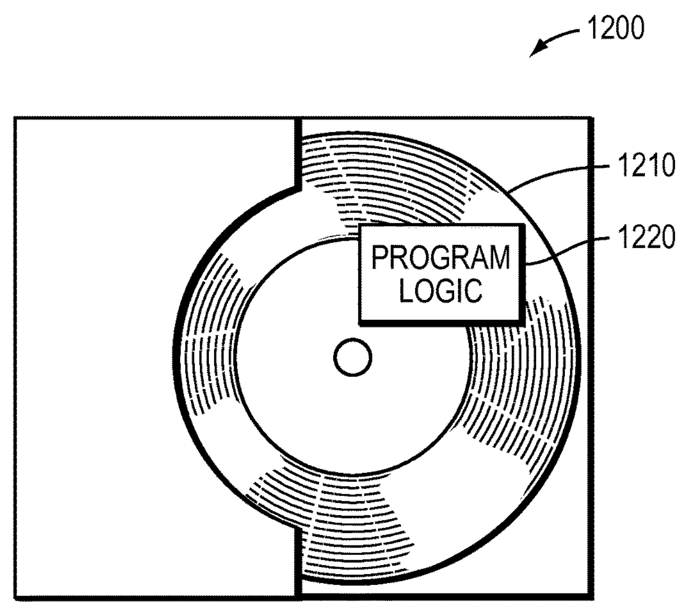
FIG. 12 is a diagram illustrating an example embodiment method of the present disclosure embodied as program code or a program product.

Refer now to the example embodiment of FIG. 12. FIG. 12 shows Program Logic 1220 embodied on a computer-readable medium 1210 as shown, and wherein the Program Logic 1220 is encoded in computer-executable code configured for carrying out the measurement and analysis process of this invention and thereby forming a Computer Program Product 1200.

The logic for carrying out the method may be embodied as part of the aforementioned system, which is useful for carrying out a method described with reference to embodiments shown in, for example, FIG. 3, FIG. 5, FIG. 7, FIG. 9, and FIG. 11. For purposes of illustrating the present invention, the invention is described as embodied in a specific configuration and using special logical arrangements, but one skilled in the art will appreciate that the device is not limited to the specific configuration but rather only by the claims included with this specification.

Figure 13:
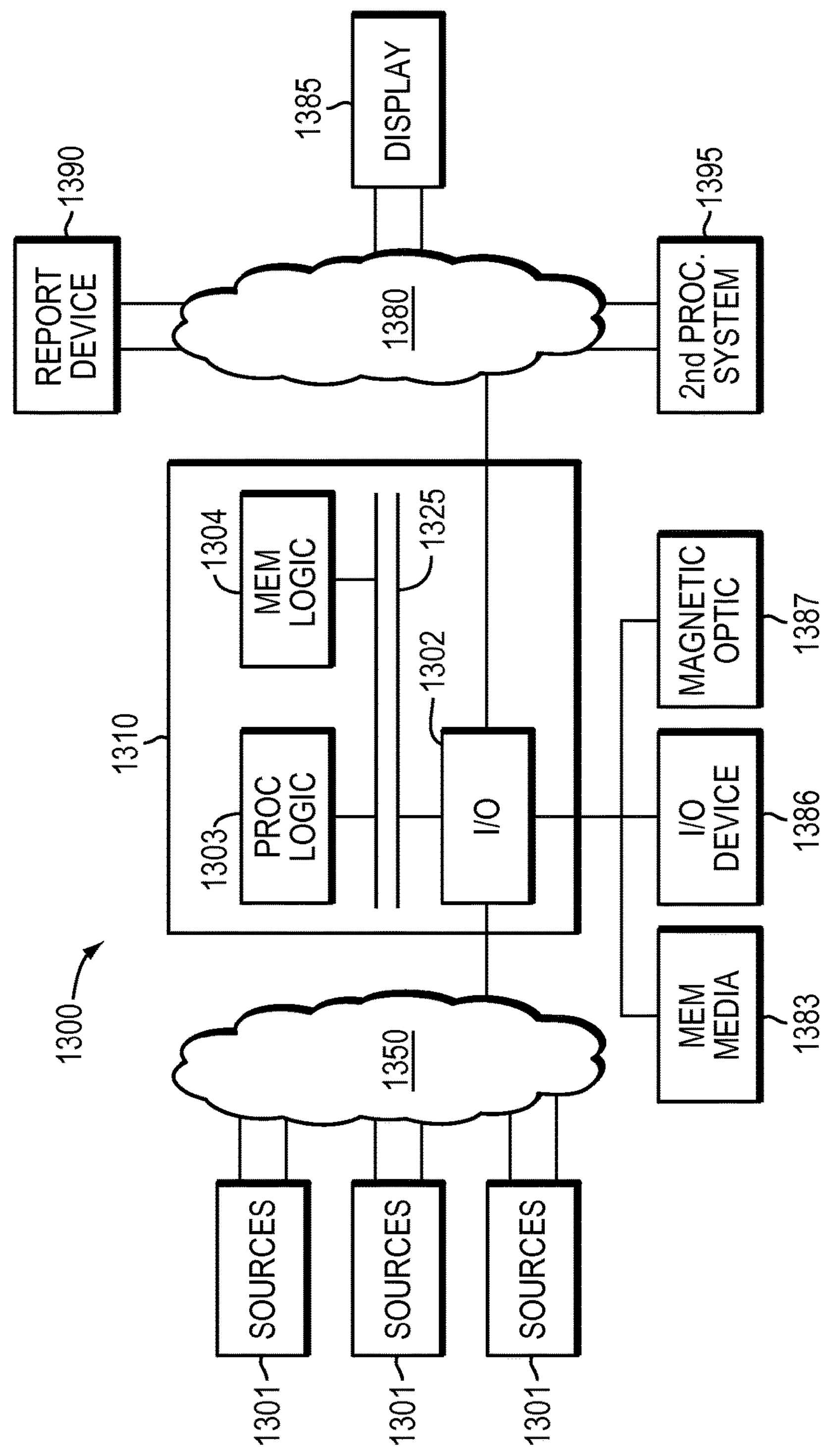
FIG. 13 is an example of an embodiment of an apparatus that may utilize the techniques described herein, in accordance with an embodiment of the present disclosure.

Refer now to the example embodiment of FIG. 13. The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. A processor may be a physical processor or one or a virtual processor. In certain embodiments, a virtual processor may correspond to one or more or parts of one or more physical processors.

The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A computer implemented method for automating creation of virtual storage pools within software-defined storage, the method comprising:

receiving a set of physical storage resources that is enabled to have different storage capabilities, wherein each of the physical storage resources in the set of physical storage resources with different capabilities is represented as a physical storage multi-dimensional capability vector;

receiving a set of applications, wherein each application of the set of applications is enabled to require a different storage capability and is comprised of a different application type;

arranging the set of applications into classes of applications according to corresponding application types and assigning a priority level to each of the classes of applications, wherein each of the applications in the set of applications enabled to have a different physical storage requirement and application type is represented, following the arranging, as a multi-dimensional application requirement vector, wherein the dimensions in the multi-dimensional application requirement vector represent corresponding physical storage requirements, application type, and associated priority level;

finding most frequently preferred physical storage requirements from the multi-dimensional application requirement vectors;

identifying a number of virtual storage pools based on the set of applications, wherein the virtual storage pools are represented as a virtual storage pool multi-dimensional capability vector for a grouping of the physical storage resources;

clustering at least some of the set of physical storage resources into the number of identified virtual storage pools; and processing the physical storage multi-dimensional capability vector, the virtual storage pool multi-dimensional capability vector, and the multi-dimensional application requirement vector to organize the physical storage resources managed by the software-defined storage into the virtual storage pools for meeting requirements of workloads of the set of applications;

wherein organizing the physical storage resources into the virtual storage pools is further implemented as a function of the priority levels assigned to the classes of applications.

2. The method of claim 1, wherein the clustering of the virtual storage pools comprises clustering physical storage resources with similar capability vectors into virtual storage pools according to application workloads.

3. The method of claim 1, wherein identifying the number of virtual storage pools comprises combining the classes of applications with similar multi-dimensional application requirement vectors to create a corresponding number of virtual storage pools.

4. The method of claim 1, wherein clustering at least some of the set of physical storage resources into the virtual storage pools comprises calculating similarity between most frequently preferred physical storage requirements for the set of applications.

5. The method of claim 1, further comprising configuring the virtual storage pools to initialize and be configured before a platform for the software-defined storage is deployed.

6. The method of claim 1, further comprising configuring the virtual storage pools to initialize and be configured after a platform for the software-defined storage is deployed.

7. The method of claim 1, wherein the capabilities represented in the physical storage multi-dimensional capability vector include capacity, input/output operations per second, and disaster recovery support.

8. The method of claim 1, wherein the virtual storage pool multi-dimensional capability vector and the multi-dimensional application requirement vector each share a portion of the same dimensions as the physical storage multi-dimensional capability vector.

9. A computer program product for automating creation of virtual storage pools within software-defined storage, the computer program product comprising:

a non-transitory computer-readable storage medium encoded with computer-executable program code enabling:

receiving a set of physical storage resources that is enabled to have different storage capabilities, wherein each of the physical storage resources in the set of physical storage resources with different capabilities is represented as a physical storage multi-dimensional capability vector;

receiving a set of applications, wherein each application of the set of applications is enabled to require a different storage capability and is comprised of a different application type;

arranging the set of applications into classes of applications according to corresponding application types and assigning a priority level to each of the classes of applications, wherein each of the applications in the set of applications enabled to have a different physical storage requirement and application type is represented, following the arranging, as a multi-dimensional application requirement vector, wherein the dimensions in the multi-dimensional application requirement vector represent corresponding physical storage requirements, application type, and associated priority level finding most frequently preferred physical storage requirements from the multi-dimensional application requirement vector;

identifying a number of virtual storage pools based on the set of applications, wherein the virtual storage pools are represented as a virtual storage pool multi-dimensional capability vector for a grouping of the physical storage resources;

clustering at least some of the set of physical storage resources into the number of identified virtual storage pools; and processing the physical storage multi-dimensional capability vector, the virtual storage pool multi-dimensional capability vector, and the multi-dimensional application requirement vector to organize the physical storage resources managed by the software-defined storage into the virtual storage pools for meeting requirements of workloads of the set of applications;

wherein organizing the physical storage resources into the virtual storage pools is further implemented as a function of the priority levels assigned to the classes of applications.

10. The computer program product of claim 9, wherein the clustering of the virtual storage pools comprises clustering physical storage resources with similar capability vectors into virtual storage pools according to application workloads.

11. The computer program product of claim 9, wherein identifying the number of virtual storage pools comprises combining the classes of applications with similar multi-dimensional application requirement vectors to create a corresponding number of virtual storage pools.

12. The computer program product of claim 9, wherein clustering at least some of the set of physical storage resources into the virtual storage pools comprises calculating similarity between most frequently preferred physical storage requirements for the set of applications.

13. A system for automating creation of virtual storage pools within software-defined storage, the system comprising:

a computer having a memory and a processor;

computer-executable program code operating in the memory on the processor, wherein the computer-executable program code is configured to enable the processor to execute the following:

receiving a set of physical storage resources that is enabled to have different storage capabilities, wherein each of the physical storage resources in the set of physical storage resources with different capabilities is represented as a physical storage multi-dimensional capability vector;

receiving a set of applications, wherein each application of the set of applications is enabled to require a different storage capability and is comprised of a different application type;

arranging the set of applications into classes of applications according to corresponding application types and assigning a priority level to each of the classes of applications, wherein each of the applications in the set of applications enabled to have a different physical storage requirement and application type is represented, following the arranging, as a multi-dimensional application requirement vector, wherein the dimensions in the multi-dimensional application requirement vector represent corresponding physical storage requirements, application type, and associated priority level;

finding most frequently preferred physical storage requirements from the multi-dimensional application requirement vectors;

identifying a number of virtual storage pools based on the set of applications, wherein the virtual storage pools are represented as a virtual storage pool multi-dimensional capability vector for a grouping of the physical storage resources;

clustering at least some of the set of physical storage resources into the number of identified virtual storage pools; and processing the physical storage multi-dimensional capability vector, the virtual storage pool multi-dimensional capability vector, and the multi-dimensional application requirement vector to organize the physical storage resources managed by the software-defined storage into the virtual storage pools for meeting requirements of workloads of the set of applications;

wherein organizing the physical storage resources into the virtual storage pools is further implemented as a function of the priority levels assigned to the classes of applications.

14. The system of claim 13, wherein the clustering of the virtual storage pools comprises clustering physical storage resources with similar capability vectors into virtual storage pools according to application workloads.

15. The system of claim 13, wherein identifying the number of virtual storage pools comprises combining the classes of applications with similar multi-dimensional application requirement vectors to create a corresponding number of virtual storage pools.

16. The system of claim 13, wherein clustering at least some of the set of physical storage resources into the virtual storage pools comprises calculating similarity between most frequently preferred physical storage requirements for the set of applications.

* * * * *